United States Patent [19]

Bliznak et al.

[11] 4,425,164

[45] Jan. 10, 1984

[54] AEROSOL COOKWARE LUBRICANT COMPOSITION

[75] Inventors: John B. Bliznak, Lombard; Armando Algas, Chicago, both of Ill.

[73] Assignee: Alberto-Culver Company, Melrose Park, Ill.

[21] Appl. No.: 352,200

[22] Filed: Feb. 25, 1982

Related U.S. Application Data

[63] Continuation-in-part of Ser. No. 159,832, Jun. 16, 1980, abandoned.

[51] Int. Cl.$^3$ .................... C08L 89/00; C08L 3/00; C09K 3/30
[52] U.S. Cl. ............................ 106/150; 106/211; 106/243; 106/267; 252/305
[58] Field of Search ............ 106/211, 150, 243, 267; 252/305

[56] References Cited

U.S. PATENT DOCUMENTS

| 3,218,263 | 11/1965 | Boyle et al. | 252/305 |
| 3,661,605 | 5/1972 | Rubin et al. | 106/244 |
| 4,211,802 | 7/1980 | Carey | 426/609 |

*Primary Examiner*—Theodore Morris

[57] ABSTRACT

An aerosol cookware lubricant composition, which comprises a vegetable oil solution of an emulsifier (e.g., lecithin) in admixture with a hydrocarbon propellant, is adapted for visually-directed uniform application by incorporating therein a limited but significant concentration of particles of white flour or white starch together with a sufficient amount of fumed silica to prevent the flour from causing container packing or valve clogging, as well as minimizing spray billowing.

7 Claims, No Drawings

AEROSOL COOKWARE LUBRICANT COMPOSITION

RELATED APPLICATION

This application is a continuation-in-part of a pending application Ser. No. 159,832, filed June 16, 1980, now abandoned.

BACKGROUND AND PRIOR ART

The field of this invention is sprayable cookware lubricant compositions which are applied to the inside of pans used for baking bread, cakes, etc. to promote the release of the baked product from the pans. One standard practice which has been used many years by cooks is to apply a coating of a solid or liquid fat or oil to the inside of the pan, and then to dust the coating with flour. Formulas and products have also been developed for applying pre-mixed compositions by aerosol or pump-type sprays. In particular, lecithin has been proposed for use in such compositions as a pan release agent. See U.S. Pat. Nos. 3,038,816, 3,661,605, 3,896,975, and 4,073,411.

U.S. Pat. No. 3,038,816 described an aerosol preparation for use as a cookware lubricant which is composed primarily of lecithin dissolved in a fluorocarbon propellant. This system depends on the solubility of the lecithin in the propellant, and is not adapted to the use of hydrocarbon propellants as now preferred for reasons of environmental protection. Water dispersible forms of lecithin, such as hydroxylated lecithin, can be dispersed in water, which is then emulsified with a vegetable oil, and the emulsion pressurized with a hydrocarbon propellant, as described in U.S. Pat. No. 3,661,605. U.S. Pat. No. 3,896,975 discloses a non-foaming water-in-oil emulsion using lecithin selected for its low HLB number. U.S. Pat. No. 4,073,411 also discloses a water-in-oil lecithin emulsion which is claimed to provide improved freeze-thaw stability.

Proposals have also been made for cookware lubricant compositions containing fats or oils together with flour or starch. See U.S. Pat. Nos. 2,210,043 and 3,821,007. One problem with such compositions is the tendency of the starch or flour particles to separate on standing. According to U.S. Pat. No. 3,821,007 a normally solid vegetable fat can be used in combination with a liquid fat to assist in maintaining the suspension of the flour. The formula disclosed therein contains about 25% by weight of flour (wheat and soybean). This preparation would be very difficult to dispense from an aerosol container because of its content of solid fat and the high proportion of particulate solids. Where this composition is formulated with a hydrocarbon propellant to avoid use of a freon-type propellant, it has been found that severe packing, clogging, and billowing problems are encountered.

The present invention utilizes a vegetable oil solution of lecithin, or other emulsifier in admixture with a hydrocarbon propellant, such as isobutane, as a sprayable cookware lubricant. This mixture provides a single liquid phase which foams on application. Because of the translucency of the single liquid phase, it is difficult to visually determine that a thin, uniform coating of the lubricant composition is being applied to the inside of the baking container. Over-application of the lubricant in some areas results with consequent run-down of the liquid, and under-application in other areas results in an insufficient release action. However, it has been found that the ease with which a uniform application can be visually-directed is greatly improved by incorporating a limited but significant amount of particles of white flour or white starch in the composition. These solid phase particles reflect the light, permitting the coating distribution and thickness to be much more readily observed by the person applying the aerosol composition.

There is a further related problem. The particles of flour or starch tend to settle rapidly out of the single liquid phase requiring repeated shaking of the aerosol container to assure that there will be a relatively uniform distribution of the white particles in the spray being applied. Further, when the concentration of flour, or a mixture of flour and starch, is increased to as much as 25 to 30% by weight of the total composition, the settled particles tend to pack into the form of a cake, which is difficult to redisperse by shaking the container. Further, when only partial redistribution is obtained, the aggregates of particles can result in clogging of the valve of the aerosol dispenser.

It has been found that the advantage of having the particles of flour or starch present as a visual indicator can be obtained without the disadvantages just referred to providing the concentration of the flour and starch is limited to no more than 15% by weight of the total composition. The most desirable concentration for the purpose of this invention is found to be in the range from 2 to 10%. Moreover, the ease with which the white particles of flour or starch can be resuspended and maintained as a relatively uniform distribution during spraying is promoted by the incorporation of a small amount of fumed silica. Thus the problems of container packing and valve clogging are avoided. Also, the presence of the fumed silica increases the viscosity of the composition without interfering with its sprayability, thereby effectively controlling spray billowing on application.

DETAILED DESCRIPTION

In practicing the present invention, any of the common vegetable oils can be used, such as soybean oil, cottonseed oil, corn oil, etc. Good results are obtained with soybean oil. The term "vegetable oil" refers to the vegetable oils which are liquid at normal use temperatures (50°–80° F.), as distinguished from fully hydrogenated vegetable fats which are solid at such temperatures. For example, vegetable oils having a viscosity at 25° C. of about 100 to 300 centipoise. The vegetable oils, such as soybean oil, may comprise from 40 to 80% by weight of the total composition.

The lecithin which is dissolved in the vegetable oil may comprise standard oil-soluble lecithin. However, licithin in a water-dispersible form can be used either instead of or in admixture with the non-water dispersible lecithin. Natural lecithin, such as soybean lecithin, may be chemically reacted to improve its water dispersibility, such as by hydroxylation, and/or acylation. See, for example, U.S. Pat. No. 3,962,292. The use of at least part hydroxylated lecithin has the advantage that the applied foam has increased opagueness and this also assists in the visual-direction of a uniform application. Hydroxylated lecithin is therefore preferred. The total amount of lecithin may range from 2 to 20% by weight of the complete composition. Preferably, the formulation contains at least 6% of total lecithin. In a preferred embodiment, the formulation contains from 3 to 10% of hydroxylated lecithin in admixture with 3 to 10% of standard lecithin. This is an advantageous combination with respect to cost and effectiveness.

Processes for preparing hydroxylated lecithin are described in U.S. Pat. Nos. 2,445,948 and 2,629,662. In general, the degree of hydroxylation is such that the iodine value of the lecithin is reduced from about 5 to 20%. Hydroxylated lecithin is available commercially. One such product is Centrolene "A", which is manufactured and sold by Central Soya Company, Fort Wayne, Ind. Suitable standard lecithins are available from a number of commercial sources in the United States, such as the Sta-Sol BF Lecithin, manufactured and sold by A. E. Staley Company, Decatur, Ill.

The propellant may comprise any of the standard hydrocarbon propellants, such as isobutane, n-butane, propane, or mixtures thereof. Isobutane is preferred. In general, the hydrocarbon propellant can be employed in an amount of about 10 to 40% by weight of the complete composition, and a preferred range is from about 20 to 30%. With higher concentrations of propellant, the applied spray tends to "billow" due to the rapid flash-off of the propellant. Therefore, it is preferred to employ only enough propellant for effective aerosol spraying without using an excess amount. However, the use of fumed silica, as described below, effectively controls billowing for the preferred formulations.

The white particles which serve as a visual indicator of application uniformity may be comprised of white flour, or starch, or mixtures of flour and starch. White flour is preferred, such as particularly white wheat flour. Where starch is employed either alone or in admixture with the flour, the starch may comprise corn starch, potato starch, or other vegetable starches in a white particulate form. Other cereal or vegetable flours can be used besides wheat flour. For obtaining the benefits of the present invention without consequent disadvantages, the total concentration of the flour and starch should be limited to the range of 2 to 15% by weight of the total composition. A preferred range, such as when using white wheat flour, is from 3 to 10% by weight.

Whem employing the flour or starch at the concentrations specified above, it is desirable to also incorporate a small but effective amount of fumed silica. This material is produced by flame hydrolysis of silicon tetrachloride, and is available from several commercial sources, such as the Aerosil fumed silica products of Degussa, Inc., Teterboro, N.J., and the Cab-O-Sil fumed silica products of Cabot Corporation, Boston, Mass. A particularly desirable commercial product is Aerosil 200. Cab-O-Sil M-5 and MS-5 are similar products. The fumed silica is used in an amount ranging from 0.5 to 2.0% based on the total composition, such as about 1.8%. This small amount of fumed silica provides remarkable advantages. It effectively prevents packing of the composition on settling in the aerosol container. Further, the reformed suspension is sufficiently fine and uniform to avoid valve clogging. Also, as indicated above, the silica increases the viscosity of the suspension without interfering with its sprayability. This action has an important effect in controlling undue billowing of the spray.

Other minor ingredients can be included, as is well known in the art. For example, a small amount of an antioxidant can be added to control oxidation of the vegetable oil. One suitable antioxidant is Tenox 20, which is butylhydroxyquinone (Eastman Chemical Products, Inc., Kingsport, Tenn.

Summarizing, a general formulation of cookware lubricant compositions prepared in accordance with the present invention is as follows:

| General Formula | |
|---|---|
| Ingredients | Weight % |
| Vegetable Oil | 40-80 |
| Lecithin | 2-20 |
| Hydrocarbon Propellant | 10-40 |
| White Particles (flour or starch) | 2-15 |
| Fumed Silica | 0.5-2.0 |

More specifically, a preferred formula for practicing the present invention can be set out as follows:

| Preferred Formula | |
|---|---|
| Ingredients | Weight % |
| Vegetable Oil | 45-70 |
| Hydroxylated Lecithin | 3-10 |
| Standard Lecithin | 3-10 |
| Isobutane Propellant | 20-30 |
| White Flour | 3-10 |
| Fumed Silica | 0.5-2.0 |

In preparing lubricant composition in accordance with the present invention, a suitable manufacturing procedure is as follows: The lecithin, which may be preheated to 110°-120° F., is mixed with the vegetable oil until a uniform solution is obtained. The fumed silica may then be added slowly with agitation until a uniform mixture is obtained. Thereafter the flour or starch is added with agitation and mixing is contained until a uniform dispersion is again obtained. The resulting concentrate may then be homogenized, and filled into aerosol containers, which are then charged with the hydrocarbon propellant.

For additional information about a specific preferred formula and its method of preparation, reference may be had to the following example.

EXAMPLE

Cookware lubricant composition is prepared in accordance with Formula A, as set out below:

| Formula A | | |
|---|---|---|
| Ingredients | Weight % Concentrates | Weight % Finished |
| Soybean Oil | 73.980 | 55.2385 |
| Hydroxylated Lecithin | 8.300 | 6.1973 |
| Standard Lecithin | 8.300 | 6.1973 |
| Fumed Silica | 2.400 | 1.7920 |
| White Wheat Flour | 7.000 | 5.2267 |
| Antioxidant | 0.020 | 0.0149 |
| Isobutane | | 25.3333 |
| | 100.000 | 100.0000 |

In the foregoing formula, the hydroxylated lecithin may be Centrolene "A" (Central Soya Company, Fort Wayne, Ind.); the standard lecithin may be Sta-Sol BF (A. E. Staley Company, Decatur, Ill.); the fumed silica may be Aeroxil 200 (Degussa, Inc., Teterboro, N.J.); the wheat flour may be Pillsbury Best XXXX Flour Code 2589 (Pillsbury Company, Minneapolis, Minn.); the antioxidant may be Texox 20 (t-butylhydroxyquinone), Eastman Chemical Products, Inc., Kingsport, Tenn.

A suitable manufacturing procedure consists of the following steps:

(1) In a suitably covered stainless steel tank equipped with a lightning mixer, pump in the soybean oil. If the oil is at room temperature (70° to 90° F.), heating is not required.

(2) Add the antioxidant and agitate for two minutes.

(3) Continue the agitation, and add the hydroxylated lecithin and the standard lecithin. Continue mixing until a uniform mixture is obtained. (Approximately 5 minutes).

Note: The lechithin should be sufficiently warm to effect pourability. Preheat if necessary to 110°–120° F., not to exceed 140° F.

(4) Add the fumed silica slowly with agitation. Continued mixing until uniform; approximately 10 more minutes after all the fumed silica has been added.

(5) Add the flour slowly with agitation. Mix unitl smooth with no lumps being present: approximately 15 minutes after all of the flour has been added.

(6) The resulting concentrate is then homogenized at 2000 psig using a standard homogenizer. The homogenized concentrate may be used immediately or stored for future use.

(7) Fill the mixture into aerosol containers, apply the valve-equipped closures, and charge the containers with the isobutane propellant. The proportions of propellant to the concentrate are 25:75, as indicated by Formula A.

In using the packaged lubricant composition, the aerosol containers may be shaken lightly to redisperse any of the particles of flour which have settled, and to obtain a relatively uniform dispersion of the flour in the single liquid phase. The presence of the fumed silica will assist the resuspension of the flour and will maintain it in suspension while being applied. As the composition is sprayed onto the inside of the baking container, the spray may be directed so that a relatively uniform coating of the foam composition is deposited. As the foam breaks, the thickness of the coating and its distribution can be visually observed. Over-application of the spray, resulting in unnecessary waste of the spray can be avoided. At the same time, a thin, relatively uniform coating can be obtained, and the thickness of the coating and its distribution can be observed. Further the spray is not wasted by misdirection due to billowing.

We claim:

1. An aerosol cookware lubricant composition adapted for visually-directed uniform application, said composition being in the form of a single liquid phase composed essentially of vegetable oil solution of an emulsifier in admixture with a propellant, wherein the improvement comprises having present in said composition from 2 to 15% of insoluble white particles selected from the class consisting of white flour, or white starch particles, or mixtures thereof, and from 0.5 to 2.0% of fumed silica, said composition containing from 10 to 40% of a hydrocarbon propellant selected from the class consisting of isobutane, n-butane, propane, and mixtures thereof, said composition containing from 2 to 20% by weight of water-dispersible lecithin, said percentages being by weight and being based on the total weight of said composition, the vegetable oil in said composition being liquid at normal use temperatures.

2. An aerosol cookware lubricant composition adapted for visually-directed uniform application, said composition being in the form of a single liquid phase composed essentially of vegetable oil solution of lecithin in admixture with a propellant, said composition containing from 2 to 20% of said lecithin and from 50 to 75% of said vegetable oil together with an amount of said propellant effective for aerosol spraying of said composition, wherein the improvement comprises having present in said composition from 2 to 10% of insoluble white particles selected from the class consisting of white flour, or white starch particles, or admixtures thereof, and from 0.5 to 2.0% of fumed silica, said composition containing at least 3% hydroxylated lecithin, said propellant being a hydrocarbon propellant selected from the class consisting of isobutane, n-butane, propane, and mixtures thereof, and the amount thereof being limited to 20 to 30% of said composition, said percentages being by weight and being based on the total weight of said composition, the vegetable oil in said composition being liquid at normal use temperatures.

3. The composition of claim 2 in which said lecithin comprises a mixture of 3 to 10% of hydroxylated lecithin together with 3 to 10% of lecithin in a non-water dispersible form, said percentages being by weight and being based on the total weight of said composition.

4. The composition of claim 2 or claim 3 in which said white particles are white wheat flour.

5. The aerosol cookware lubricant composition adapted for visually-directed uniform application, said composition being in the form of a single liquid phase composed essentially of vegetable oil solution of lecithin in admixture with a hydrocarbon propellant selected from the class consisting of isobutane, n-butane, propane, and mixtures thereof, said vegetable oil being soybean oil and being present in an amount of from 50 to 75%, said lecithin being present in an amount of from 8 to 16%, and said hydrocarbon propellant being present in an amount of from 20 to 30%, said composition being further characterized by having present therein from 2 to 10% of insoluble white particles selected from the class consisting of white flour, or white starch particles, or mixtures thereof, and from 0.5 to 2.0% of fumed silica, said composition containing at least 3% of hydroxylated lecithin, said percentages being by weight and being based on the total weight of said composition, the vegetable oil in said composition being liquid at normal use temperatures.

6. The composition of claim 5 in which said white particles are white wheat flour.

7. The composition of claim 5 or claim 6 in which said composition contains from 3 to 10% of hydroxylated lecithin, the rest of said lecithin being in a non-water dispersible form, said percentages being by weight and being based on the total weight of said composition, and said hydrocarbon propellant being isobutane.

* * * * *